3,249,637
3-(4-HALOPHENYL)SALICYLANILIDES
Jack D. Early, Florissant, and John P. Chupp, Kirkwood, Mo., assignors to Monsanto Company, a corporation of Delaware
No Drawing. Filed Nov. 16, 1962, Ser. No. 238,268
7 Claims. (Cl. 260—559)

This invention relates to new and useful 3-(4-halophenyl)salicylanilides.

In accordance with this invention there is provided a new and useful class of compounds, namely, 3-(4-halophenyl)salicylanilides on the formula

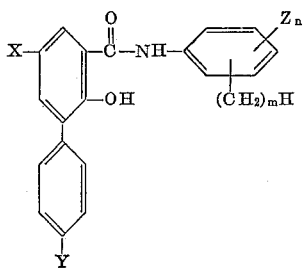

wherein X is hydrogen or halogen of atomic weight in the range of 35 to 80 (i.e., chlorine or bromine) and wherein Y is halogen of atomic weight in the range of 35 to 80 (i.e., chlorine or bromine), wherein $m$ is an integer from 0 to 1 but preferably 0, wherein Z is halogen of atomic weight in the range of 18 to 80 (i.e., fluorine, chlorine or bromine) and wherein $n$ is a whole number from 1 to 3. In general X, Y and Z will be like or unlike halogens of atomic weight in the range of 35 to 80 and $m$ will be zero.

The 3-(4-halophenyl)salicylanilides of this invention are prepared by reacting substantially equimolecular proportions of a 3-(4-halophenyl)salicylic acid of the formula

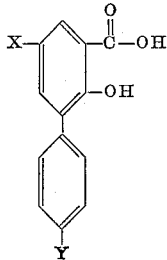

wherein X and Y have the aforedescribed significance, or mixtures thereof, and a primary aromatic amine of the formula

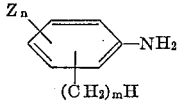

wherein Z, $m$ and $n$ have the aforedescribed significance or mixtures thereof, in the presence of 0.33 to 1 molecular proportion of phosphorus trichloride. Where and when desired an inert organic solvent (e.g., benzene, toluene, chlorobenzene, xylene, dichlorobenzene, trichlorobenzene, etc.) can be used. While a wide range of reaction temperatures can be employed in general the reaction temperatures will be in the range of 60° C. to 200° C.

As illustrative of the 3-(4-halophenyl)salicylanilides of this invention are the following:

4'-chloro-3-(4-chlorophenyl)salicylanilide
3',4'-dichloro-3-(4-chlorophenyl)salicylanilide
2',5'-dibromo-3-(4-chlorophenyl)salicylanilide
2',4'-dichloro-3-(4-bromophenyl)salicylanilide
2',5-dichloro-3-(4-chlorophenyl)salicylanilide
3',5-dichloro-3-(4-chlorophenyl)salicylanilide
4',5-dichloro-3-(4-chlorophenyl)salicylanilide
3',5-dibromo-3-(4-chlorophenyl)salicylanilide
4',5-dibromo-3-(4-chlorophenyl)salicylanilide
4',5-dibromo-3-(4-bromophenyl)salicylanilide
4',5-dichloro-3-(4-bromophenyl)salicylanilide
4'-bromo-5-chloro-3-(4-chlorophenyl)salicylanilide
4'-fluoro-5-chloro-3-(4-chlorophenyl)salicylanilide
2',4',5-trichloro-3-(4-chlorophenyl)salicylanilide
3',4',5-trichloro-3-(4-chlorophenyl)salicylanilide
2',6',5-trichloro-3-(4-chlorophenyl)salicylanilide
3',5,5'-trichloro-3-(4-chlorophenyl)salicylanilide
3',4'-dibromo-5-chloro-3-(4-chlorophenyl)salicylanilide
3',4'-dichloro-5-bromo-3-(4-bromophenyl)salicylanilide
2',4'-difluoro-5-chloro-3-(4-chlorophenyl)salicylanilide
2',4',5,5'-tetrachloro-3-(4-chlorophenyl)salicylanilide
3',4',5,5'-tetrachloro-3-(4-chlorophenyl)salicylanilide
2',4',5,5'-tetrabromo-3-(4-chlorophenyl)salicylanilide
2',4',5,5'-tetrabromo-3-(4-bromophenyl)salicylanilide
3',5-dichloro-2'-methyl-3-(4-chlorophenyl)salicylanilide
4',5-dichloro-2'-methyl-3-(4-chlorophenyl)salicylanilide
4',5-dibromo-2'-methyl-3-(4-chlorophenyl)salicylanilide
and the like and various mixtures thereof.

Of the 3-(4-halophenyl)salicylanilides of this invention those of the formula

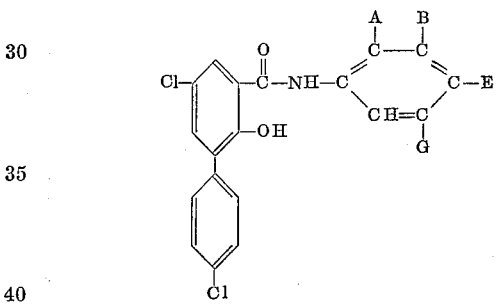

wherein A, B, E and G are hydrogen or chlorine but wherein at least one but not more than three of said A, B, E and G is chlorine are particularly useful in combatting chewing insects of the order Lepidoptera, especially the family Phalaenidae (sometimes termed Noctuidae).

As illustrative of the preparation of the 3-(4-halophenyl)salicylanlides of this invention is the following:

Example A.—5-chloro-3-(4-chlorophenyl)salicylic acid

To a suitable reaction vessel is charged 49.6 parts by weight of 5-chloro-3-phenylsalicylic acid, 210 parts by weight of glacial acetic acid, and 0.5 part by weight of iron filings. The so-charged mass is heated up to about 55° C. and while maintaining the mass at about 50–60° C. 14.2 parts by weight of gaseous chlorine is added beneath the surface over a two hour period. The reaction mass is then heated with agitation for two hours at 60–70° C. The mass is then cooled to room temperature and filtered. The filter cake is washed first with cold acetic acid, then with water and dried. This dried product on recrystallizing from acetic acid gave solid 5-chloro-3-(4-chlorophenyl)salicylic acid which melts at 235–236° C.

Example B.—5-chloro-3-(4-bromophenyl)salicylic acid

Employing the procedure of Example A but replacing gaseous chlorine with an equimolecular amount of liquid bromine there is obtained 5-chloro-3-(4-bromophenyl)salicylic acid, a solid.

Example C.—5-bromo-3(4-bromophenyl)salicylic acid

Employing the procedure of Example A but replacing 5-chloro-3-phenylsalicylic acid and gaseous chlorine respectively with equimolecular amounts of 5-bromo-3-phenylsalicylic acid and liquid bromine there is obtained 5-bromo-3-(4-bromophenyl)salicylic acid, a solid.

*Example D.—5-bromo-3-(4-chlorophenyl)salicylic acid*

Employing the procedure of Example A but replacing 5-chloro-3-phenylsalicylic acid with an equimolecular amount of 5-bromo-3-phenylsalicylic acid there is obtained 5-bromo-3-(4-chlorophenyl)salicylic acid, a solid.

*Example E.—3-(4-chlorophenyl)salicylic acid*

To a suitable reaction vessel is charged 22.7 parts by weight of o-(4-chlorophenyl)phenol, 2.4 parts by weight of sodium hydroxide and 3 parts by weight of water. The so-charged mass is heated to about 80° C. and thereto is added about 80 parts by weight of benzene. The water and benzene are distilled off and the mass heated to about 150° C. While maintaining the temperature at about 140–160° C. gaseous carbon dioxide is added over a period of about two hours. During this addition small amounts of ethylene glycol are added to maintain a slurry. The mass is cooled to room temperature, washed with water and the washings collected. This solution is saturated with carbon dioxide and filtered. The filtrate is acidified and the precipitate filtered off. The precipitate after recrystallization from acetic acid is identified as 3-(4-chlorophenyl)salicylic acid, a solid melting at 219–221° C.

*Example F.—3-(4-bromophenyl)salicylic acid*

Employing the procedure of Example E but replacing o-(4-chlorophenyl)phenol with an equimolecular amount of o-(4-bromophenyl)phenol there is obtained 3-(4-bromophenyl)salicylic acid, a solid.

*Example I*

To a suitable reaction vessel equipped with a thermometer and agitator is charged 10 parts by weight of 5-chloro-3-(4-chlorophenyl)salicylic acid and about 110 parts by weight of chlorobenzene and the mass heated to about 70° C. Then 5.8 parts by weight of 3,4-dichloroaniline is added with agitation and the mass heated to 80–90° C. Then 2.5 parts by weight of phosphorus trichloride in about 11 parts by weight of chlorobenzene is added with agitation. Thereupon the mass is heated at 130–140° C. for five hours. The mass is cooled to about 70° C. whereupon and with agitation about 50 parts by weight of water and about 50 parts by weight of 20 percent hydrochloric acid is added. The mass is permitted to stand for about fifteen minutes. The organic layer is separated and washed first with water and then with dilute aqueous sodium bicarbonate and finally with water. The so washed organic mass is then stripped of volatiles under vacuum. The residue is recrystallized from chlorobenzene to give 3',4',5-trichloro-3-(4-chlorophenyl)salicylanilide, a solid which melts at 193–194° C.

*Example II*

Employing the procedure of Example I but replacing 5-chloro-3-(4-chlorophenyl)salicylic acid with an equimolecular amount of 5-bromo-3-(4-bromophenyl)salicylic acid there is obtained 3',4'-dichloro-5-bromo-3-(4-bromophenyl)salicylanilide, a solid.

*Example III*

Employing the procedure of Example I but replacing 3,4-dichloroaniline with an equimolecular amount of 3,4-dibromoaniline there is obtained 3',4'-dibromo-5-chloro-3-(4-chlorophenyl)salicylanilide, a solid.

*Example IV*

Employing the procedure of Example I but replacing 3,4-dichloroaniline with an equimolecular amount of 2,4-difluoroaniline there is obtained 2',4'-difluoro-5-chloro-3-(4-chlorophenyl)salicylanilide.

*Example V*

To a suitable reaction vessel equipped with a thermometer and agitator is charged 10 parts by weight of 5-chloro-3-(4-chlorophenyl)salicylic acid and about 110 parts by weight of chlorobenzene and the mass heated to about 70° C. Then 4.6 parts by weight of 4-chloroaniline is added with agitation and the mass heated to 80–90° C. Then 2.5 parts by weight of phosphorus trichloride in about 11 parts by weight of chlorobenzene is added with agitation. Thereupon the mass is heated at 130–140° C. for five hours. The mass is cooled to about 70° C. whereupon and with agitation about 50 parts by weight of water and about 50 parts by weight of 20 percent hydrochloric acid is added. The mass is permitted to stand for about fifteen minutes. The organic layer is separated and washed first with water and then with dilute aqueous sodium bicarbonate and finally with water. The so washed organic mass is then stripped of volatiles under vacuum. The residue is recrystallized from ethyl alcohol to give 4',5-dichloro-3-(4-chlorophenyl)salicylanilide, a solid which melts at 173–174° C.

*Example VI*

Employing the procedure of Example V but replacing 4-chloroaniline with an equimolecular amount of 3-bromoaniline there is obtained 3'-bromo-5-chloro-3-(4-chlorophenyl)salicylanilide, a solid.

*Example VII*

Employing the procedure of Example V but replacing 4-chloroaniline with an equimolecular amount of 4-fluoroaniline there is obtained 4'-fluoro-5-chloro-3-(4-chlorophenyl)salicylanilide, a solid.

*Example VIII*

Employing the procedure of Example V but replacing 4-chloroaniline with an equimolecular amount of 2,4-dichloroaniline there is obtained 2',4',5-trichloro-3-(4-chlorophenyl)salicylanilide, a solid.

*Example IX*

Employing the procedure of Example V but replacing 5-chloro-3-(4-chlorophenyl)salicyclic acid with an equimolecular amount of 5-bromo-3-(4-bromophenyl)salicylic acid there is obtained 4'-chloro-5-bromo-3-(4-bromophenyl)salicylanilide, a solid.

*Example X*

To a suitable reaction vessel equipped with a thermometer and agitator is charged 14.1 parts by weight of 5-chloro-3-(4-chlorophenyl)salicylic acid and about 110 parts by weight of chlorobenzene and the mass heated to about 70° C. Then 9.8 parts by weight of 2,4,5-trichloroaniline is added with agitation and the mass heated to 80–90° C. Then 2.5 parts by weight of phosphorus trichloride in about 11 parts by weight of chlorobenzene is added with agitation. Thereupon the mass is heated at 130–140° C. for five hours. The mass is cooled to about 70° C. whereupon and with agitation about 50 parts by weight of water and about 50 parts by weight of 20 percent hydrochloric acid is added. The mass is permitted to stand for about fifteen minutes. The precipitate is filtered off, washed with water then with dilute aqueous sodium bicarbonate and finally with water. The organic layer of the filtrate is separated and washed first with water and then with dilute aqueous sodium bicarbonate and finally with water. The so washed organic mass is then stripped of volatiles under vacuum. The residue is combined with the washed precipitate and recrystallized from benzene to give 2',4',5,5'-tetrachloro-3-(4-chlorophenyl)salicylanilide, a solid which melts at 217–218° C.

*Example XI*

Employing the procedure of Example X but replacing 2,4,5-trichloroaniline with an equimolecular amount of 2, 6-dichloro-4-bromoaniline there is obtained 2',5,6'-trichloro-4'-bromo-3-(4-chlorophenyl)salicylanilide, a solid.

*Example XII*

Employing the procedure of Example X but replacing 2,4,5-trichloroaniline with an equimolecular amount of 2,4,5-tribromoaniline there is obtained 2',4',5'-tribromo-5-chloro-3-(4-chlorophenyl)salicylanilide, a solid.

*Example XIII*

Employing the procedure of Example X but replacing 2,4,5-trichloroaniline with an equimolecular amount of 3,4,5-trichloroaniline there is obtained 3',4',5,5'-tetrachloro-3-(4-chlorophenyl)salicylanilide, a solid.

*Example XIV*

To a suitable reaction vessel equipped with a thermometer and agitator is charged 7.1 parts by weight of 5-chloro-3-(4-chlorophenyl)salicyclic acid and about 110 parts by weight of chlorobenzene and the mass heated to about 70° C. Then 4.0 parts by weight of 2,5-dichloroaniline is added with agitation and the mass heated to 80–90° C. Then 1.3 parts by weight of phosphorus trichloride in about 11 parts by weight of chlorobenzene is added with agitation. Thereupon the mass is heated at 130–140° C. for five hours. The mass is cooled to about 70° C. whereupon and with agitation about 50 parts by weight of water and about 50 parts by weight of 20 percent hydrochloride acid is added. The mass is permitted to stand for about fifteen minutes. The organic layer is separated and washed first with water and then with dilute aqueous sodium bicarbonate and finally with water. The so washed organic mass is then stripped of volatiles under vacuum. The residue is recrystallized from methylcyclohexane to give 2',5,5'-trichloro-3-(4-chlorophenyl)salicylanilide, a solid which melts at 214–215° C.

*Example XV*

Employing the procedure of Example XIV but replacing 5-chloro-3-(4-chlorophenyl)salicylic acid with an equimolecular amount of 5-bromo-3-(4-bromophenyl)salicyclic acid there is obtained 2'-5'-dichloro-5-bromo-3-(4-bromophenyl)salicylanilide, a solid.

*Example XVI*

Employing the procedure of Example XIV but replacing 2,5-dichloroaniline with an equimolecular amount of 2,5-dibromoaniline there is obtained 2',5'-dibromo-5-chloro-3-(4-chlorophenyl)salicylanilide, a solid.

*Example XVII*

Employing the procedure of Example XIV but replacing 2,5-dichloroaniline with an equimolecular amount of 3-chloroaniline there is obtained 3',5-dichloro-3-(4-chlorophenyl)salicylanilide, a solid.

*Example XVIII*

Employing the procedure of Example XIV but replacing 2,5-dichloroaniline with an equimolecular amount of 4-chloro-o-toluidine there is obtained 4',5-dichloro-2'-methyl-3-(4-chlorophenyl)salicylanilide, a solid.

*Example XIX*

To a suitable reaction vessel equipped with a thermometer and agitator is charged 16.3 parts by weight of 5-chloro-3-(4-bromophenyl)salicylic acid and about 110 parts by weight of chlorobenzene and the mass heated to about 70° C. Then 8.1 parts by weight of 3,4-dichloroaniline is added with agitation and the mass heated to 80–90° C. Then 2.5 parts by weight of phosphorus trichloride in about 11 parts by weight of chlorobenzene is added with agitation. Thereupon the mass is heated at 130–140° C. for five hours. The mass is cooled to about 70° C. whereupon and with agitation about 50 parts by weight of water and about 50 parts by weight of 20 percent hydrochloric acid is added. The mass is permitted to stand for about fifteen minutes. The organic layer is separated and washed first with water and then with dilute aqueous sodium bicarbonate and finally with water. The so washed organic mass is then stripped of volatiles under vacuum. The residue is recrystallized from benzene to give 3',4',5-trichloro-3-(4-bromophenyl)salicylanilide, a solid which melts at 187–189° C.

*Example XX*

Employing the procedure of Example XIX but replacing 3,4-dichloroaniline with an equimolecular amount of 3,4-dibromoaniline there is obtained 3',4'-dibromo-5-chloro-3-(4-bromophenyl)salicylanilide, a solid.

*Example XXI*

Employing the procedure of Example XIX but replacing 3,4-dichloroaniline with an equimolecular amount of 2,5-dichloroaniline there is obtained 2',5,5'-trichloro-3-(4-bromophenyl)salicylanilide, a solid.

*Example XXII*

Employing the procedure of Example XIX but replacing 3,4-dichloroaniline with an equimolecular amount of 3,5-dichloroaniline there is obtained 3',5,5'-trichloro-3-(4-bromophenyl)salicylanilide, a solid.

*Example XXIII*

To a suitable reaction vessel equipped with a thermometer and agitator is charged 16.3 parts by weight of 5-chloro-3-(4-bromophenyl)salicylic acid and about 110 parts by weight of chlorobenzene and the mass heated to about 70° C. Then 6.3 parts by weight of 4-chloroaniline is added with agitation and the mass heated to 80–90° C. Then 2.5 parts by weight of phosphorus trichloride in about 11 parts by weight of chlorobenzene is added with agitation. Thereupon the mass is heated at 130–140° C. for five hours. The mass is cooled to about 70° C. whereupon and with agitation about 50 parts by weight of water and about 50 parts by weight of 20 percent hydrochloric acid is added. The mass is permitted to stand for about fifteen minutes. The organic layer is separated and washed first with water and then with dilute aqueous sodium bicarbonate and finally with water. The so washed organic mass is then stripped of volatiles under vacuum. The residue is recrystallized from methylcyclohexane to give 4',5-dichloro-3-(4-bromophenyl)salicylanilide, a solid which melts at 174–176° C.

*Example XXIV*

Employing the procedure of Example XXIII but replacing 5-chloro-3-(4-bromophenyl)salicylic acid with an equimolecular amount of 5-bromo-3-(4-chlorophenyl)salicylic acid there is obtained 4'-chloro-5-bromo-3-(4-chlorophenyl)salicylanilide, a solid.

*Example XXV*

Employing the procedure of Example XXIII but replacing 4-chloroaniline with an equimolecular amount of 4-bromoaniline there is obtained 4'-bromo-5-chloro-3-(4-chlorophenyl)salicylanilide, a solid.

*Example XXVI*

To a suitable reaction vessel equipped with a thermometer and agitator is charged 0.56 parts by weight of 3-(4-chlorophenyl)salicylic acid and about 25 parts by weight of chlorobenzene and the mass heated to about 70° C. Then 0.4 part by weight of 3,4-dichloroaniline is added with agitation and the mass heated to 80–90° C. Then 0.33 part by weight of phosphorus trichloride is added with agitation. Thereupon the mass is heated at 130–140° C. for four hours. The mass is cooled to about 70° C. whereupon and with agitation about 50 parts by weight of water and about 50 parts by weight of 20 percent hydrochloric acid is added. The mass is permitted to stand for about fifteen minutes. The organic layer is separated and washed first with water and then with dilute aqueous sodium bicarbonate and finally with water. The so washed organic mass is then stripped of volatiles under vacuum. The residue is 3',4'-dichloro-3-(4-chlorophenyl)salicylanilide, a solid which melts at 185-186° C.

Example XXVII

Employing the procedure of Example I but replacing 3-(4-chlorophenyl)salicylic acid with an equimolecular amount of 3-(4-bromophenyl)salicylic acid there is obtained 3',4'-dichloro-3-(4-bromophenyl)salicylanilide, a solid.

For purposes of demonstrating the insecticidal activity of the salicylanilides of this invention 5-chloro-3-(4-chlorophenyl)salicylanilide, a solid melting at 162-164° C., was prepared in accordance with the procedure of Example I but replacing 3,4-dichloroaniline with an equimolecular amount of aniline.

As illustrative of the insecticidal activity of the salicylanilides of this invention and that of analogues thereof the below itemized were evaluated as follows against a species of the family Phalaenidae of the order Lepidoptera.

A 1% by weight concentrate was prepared by dissolving the compound to be evaluated in 10 ml. of acetone. A 0.25 cc. tuberculin, B-D Yale syringe was filled with this concentrate and placed in a microinjection apparatus. The injector lever was pressed several times to make certain no air bubbles were trapped in the needle and the needle was wiped with filter paper to remove excess solution. The injector lever was pressed once to deliver one microliter which was applied directly to each of 12 lima bean leaf discs 0.25 inch in diameter. Individual second instar southern armyworm larvae (*Prodenia eridania*) were placed on each disc and the disc encaged with a plastic cap. After 48 hours at room temperature mortality observations were made. This procedure was repeated at decreasing concentrations and the $LD_{50}$ (i.e., the concentration in micrograms per larva giving 50% mortality) noted. The following results were obtained:

| Compound: | $LD_{50}$ |
|---|---|
| 5-chloro-3-(4-chlorophenyl)salicylic acid | 20 |
| 5-chloro-3-(4-chlorophenyl)salicylanilide | 0.51 |
| 3',4'-dichloro-3-(4-chlorophenyl)salicylanilide | 0.30 |
| 3',4',5-trichloro-3-(4-bromophenyl)salicylanilide | 0.20 |
| 4',5-dichloro-3-(4-bromophenyl)salicylanilide | 0.10 |
| 3',4',5-trichloro-3-(4-chlorophenyl)salicylanilide | 0.12 |
| 2',5,5'-trichloro-3-(4-chlorophenyl)salicylanilide | 0.07 |
| 2',4',5,5'-tetrachloro-3-(4-chlorophenyl)salicylanilide | 0.09 |
| 4',5-dichloro-3-(4-chlorophenyl)salicylanilide | 0.07 |

The salicylanilides of this invention are effective against families of insects other than Phalaenidae of the order Lepidoptera. For example in a similar feeding evaluation to that above (1) 3',4',5-trichloro-3-(4-chlorophenyl)salicylanilide at a concentration of 0.6 micrograms per larva of the leaf roller (Archips) of the family Tortricidae exhibited a 33% kill, (2) 3',4',5-trichloro-3-(4-chlorophenyl)salicylanilide at a concentration of 2.0 micrograms per larva of the spring cankerworm (*Paleacrita vernata*—Peck) of the family Geometridae exhibited an 82% kill, (3) 4',5-dichloro-3-(4-chlorophenyl)salicylanilide at a concentration of 1.0 microgram per larva of the fall webworm (*Hyphantria cunea*—Drury) of the family Arctiidae exhibited a 30% kill, and (4) 3',4',5-trichloro-3-(4-chlorophenyl)salicylanilide at a concentration of 0.6 microgram per larva of the salt marsh caterpillar (*Estigmene acrea*—Drury) of the family Arctiidae exhibited an 82% kill.

The salicylanilides are effective against the chewing insect order Orthoptera, e.g., both 4',5-dichloro-3-(4-chlorophenyl)salicylanilide and 2',4',5,5'-tetrachloro-3-(4-chlorophenyl)salicylanilide at respective concentrations of 10 micrograms per adult grasshopper (*Melanoplus differentialis*—Thomas) of the family Acridiidae exhibited an 83% kill on contact.

The salicylanilides of this invention are effective in control of mosquito larvae (*Aedes aegypti*—Linn.) of the family Culicidae of the order Diptera, e.g., at a concentration of 2 p.p.m. 3',4',5-trichloro-3-(4-bromophenyl)salicylanilide, 3',4',5-trichloro-3-(4-chlorophenyl)salicylanilide, 4',5-dichloro-3-(4-chlorophenyl)salicylanilide and 2',4',5,5'-tetrachloro-3-(4-chlorophenyl)salicylanilide exhibited a 100% kill against said mosquito larvae. In contrast at the same concentration 5-chloro-3-(4-chlorophenyl)salicylic acid exhibited no kill of the said larvae.

Although the salicylanilides of this invention are useful per se in controlling a wide variety of insect pests, it is preferable that they be supplied to the pests or to the environment of the pests in a dispersed form in a suitable extending agent.

In the instant specification and appended claims it is to be understood that the term "dispersed" is used in its widest possible sense. When it is said that the salicylanilides of this invention are dispersed, it means that the particles of the salicylanilides of this invention may be molecular in size and held in true solution in a suitable organic solvent. It means further, that the particles may be colloidal in size and distributed throughout a liquid phase in the form of suspensions or emulsions or in the form of particles held in suspension by surface-active agents of a non-ionizing character. It also includes particles which are distributed in a semi-solid viscous carrier such as petrolatum or other ointment base of a non-ionizing character in which they may be actually dissolved in the semi-solid or held in suspension in the semi-solid with the aid of suitable non-ionizing surface-active agents. The term "dispersed" also means that the particles may be mixed with and distributed throughout a solid carrier providing a mixture in particulate form, e.g., pellets, granules, powders, or dusts. The term "dispersed" also includes mixtures which are suitable for use as aerosols including solutions, suspensions, or emulsion of the salicylanilides of this invention in a carrier such as dichlorodifluoromethane and like fluorochloroalkanes which boil below room temperature at atmospheric pressure.

In the instant specification and appended claims it is to be understood that the expression "extending agent" includes any and all of those substances in which the salicylanilides of this invention are dispersed. It includes, therefore, the solvents of a true solution, the liquid phase of suspensions, emulsions or aerosols, the semi-solid carrier of ointments and the solid phase of particulate solids, e.g., pellets, granules, dusts and powders.

The exact concentration of the salicylanilides of this invention employed in combatting or controlling insect pests can vary considerably provided the required dosage (i.e., toxic or lethal amount) thereof is supplied to the pests or to the environment of the pests. When the extending agent is a liquid or mixture of liquids (e.g., as in solutions, suspensions, emulsions, or aerosols) the concentration of the salicylanilide employed to supply the desired dosage generally will be in the range of 0.001 to 50 percent by weight. When the extending agent is a semi-solid or solid, the concentration of the salicylanilide employed to supply the desired dosage generally will be in the range of 0.1 to 25 percent by weight. From a practical point of view, the manufacturer must supply the agriculturist with a low cost concentrate or spray base or particulate solid base in such form that, by merely mixing with water or solid extender (e.g., powdered clay or talc) or other low cost material available to the agriculturist at the point of use, he will have an easily prepared insecticidal spray or particulate solid. In such a concentrate composition, the salicylanilide generally will be present in a concentration of 5 to 95 percent by weight, the residue being any one or more of the well known insecticidal adjuvants, such as the surface-active clays, solvents, diluents, carrier media, adhesives, spreading agents, humectants, and the like.

There are a large number of organic liquids which can be used for the preparation of solutions, suspensions or emulsions of the salicylanilides of this invention. For example, isopropyl ether, acetone, methyl ethyl ketone, octanone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g., those boiling almost entirely under 400° F., and having a flash point above about 80° F., particularly kerosene), mineral oils having an unsulfonatable residue above about 80 percent and preferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent, e.g., an aromatic hydrocarbon and an aliphatic ketone.

When the salicylanilides of this invention are to be supplied to the insect pests or to the environment of the pests as aerosols, it is convenient to dissolve them in a suitable solvent and disperse the resulting solution in dichlorodifluoromethene or like chlorofluoroalkane which boils below room temperature at atmospheric pressure.

The salicylanilides of this invention are preferably supplied to the insect pests or to the environment of the insect pests in the form of emulsions or suspensions. Emulsions or suspensions are prepared by dispersing the salicylanilides of this invention either per se or in the form of an organic solution thereof in water with the aid of a water-soluble non-ionic surfactant. The term "surfactant" as employed here and in the appended claims is used as in volume II of Schwartz, Perry and Berch's "Surface Active Agents and Detergents" (1958, Interscience Publishers, Inc., New York), in place of the expression "emulsifying agent," to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear, "Chemistry of Insecticides, Fungicides and Herbicides," second edition, page 280). The surfactants contemplated are the well-known capillary active substances which are non-ionizing (or non-ionic) and which are described in detail in volumes I and II of Schwartz, Perry and Berch's "Surface Active Agents and Detergents" (1958, Interscience Publishers, Inc., New York), and also in the November 1947 issue of Chemical Industries (pages 811–824), in an article entitled "Synthetic Detergents," by John W. McCutcheon and also in the July, August, September and October 1952 issues of Soap and Sanitary Chemicals under the title, "Synthetic Detergents." The disclosures of these articles with respect to non-ionizing capillary active substances are incorporated in this specification by reference in order to avoid unnecessary enlargement of this specification. The preferred surfactants are the water soluble non-ionic surface-active agents set forth in U.S. 2,846,398 (issued August 5, 1958).

The salicylanilides of this invention can be dispersed by suitable methods (e.g., tumbling or grinding) in solid extending agents either of organic or inorganic nature and supplied to the insect pests environment in particulate form. Such solid materials include for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials, and include for example, such materials of organic nature as powdered cork, powdered wood, and powdered walnut shells. The preferred solid carriers are the adsorbent clays, e.g., bentonite. These mixtures can be used for insecticidal purposes in the dry form, or by addition of water-soluble non-ionic surfactants the dry particulate solids can be rendered wettable by water so as to obtain stable aqueous dispersions or suspensions suitable for use as sprays.

For special purposes the salicylanilides of this invention can be dispersed in a semi-solid extending agent such as petrolatum with or without the aid of solubility promotors and/or non-ionic surfactants.

In all of the forms described above the dispersions can be provided ready for use in combatting insect pests or they can be provided in a concentrated form suitable for mixing with or dispersing in other extending agents. As illustrative of a particularly useful concentrate is an intimate mixture of a salicylanilide of this invention with a water-soluble non-ionic surfactant which lowers the surface tension of water in the weight proportions of 0.1 to 20 parts of surfactant with sufficient of the salicylanilide of this invention to make 100 parts by weight. Such a concentrate is particularly adapted to be made into a spray for combatting various forms of insect pests by the addition of water thereto. As illustrative of such a concentrate is an intimate mixture of 20 parts by weight of 4′,5-dichloro-3-(4-chlorophenyl)salicylanilide and 2 to 5 parts by weight of a water-soluble non-ionic surfactant such as the polyoxyethylene derivatives of $C_{8-12}$ alkyl substituted phenols such as nonylphenol or dodecylphenol.

Another useful concentrate adapted to be made into a spray for combatting insect pests is a solution (preferably as concentrated as possible) of a salicylanilide of this invention in an organic solvent therefor. The said liquid concentrate preferably contains dissolved therein a minor amount (e.g., 0.5 to 15 percent by weight of the weight of the new insecticidal agent) of a non-ionic surfactant, which surfactant is also water-soluble. As illustrative of such a concentrate is a solution of 4′,5-dichloro-3-(4-chlorophenyl)salicylanilide in a mixture of xylene and 2-octanone which solution contains dissolved therein a water-soluble non-ionic surfactant such as the polyoxyethylene derivatives of $C_{8-12}$ alkyl substituted phenols such as nonylphenol and dodecylphenol.

In all of the various dispersions described hereinbefore for insecticidal purposes, the active ingredient can be one or more of the salicylanilides of this invention. The salicylanilides of this invention can also be advantageously employed in combination with other pesticides, including, for example, nematocides, bactericides, and herbicides. In this manner it is possible to obtain mixtures which are effective against a wide variety of pests and other forms of noxious life.

In controlling or combatting insect pests the salicylanilides of this invention either per se or compositions comprising same are supplied to the insect pests or to their environment in a lethal or toxic amount. This can be done by dispersing the new insecticidal agent or insecticidal composition comprising same in, on or over an infested environment or in, on or over an environment the insect pests frequent, e.g., agricultural soil or other growth media or other media attractable to the pests for habitational or sustenance or propagational purposes, in any conventional fashion which permits the insect pests to be subject to the insecticidal action of the salicylanilides of this invention. Such dispersing can be brought about by applying sprays or particulate solid compositions to a surface infested with the insect pests or attractable to the pests, as for example, the surface of an agricultural soil or other habitat media such as the above ground surface of host plants by any of the conventional methods, e.g., power dusters, boom and hand sprayers, and spray dusters. Also for sub-surface application such dispersing can be carried out by simply mixing the new insecticidal agent per se or insecticidal spray or particulate solid compositions comprising same with the infested environment or with the environment the insect pests frequent, or by employing a liquid carrier for the new insecticidal agent to accomplish sub-surface penetration and impregnation therein.

While this invention has been described with respect to certain embodiments, it is to be understood that it is not limited and that variations and modifications thereof obvious to those skilled in the art can be made without departing from the spirit and scope thereof.

The embodiments of the invention, in which an exclusive property or privilege is claimed, are defined as follows:

1. A 3-(4-halophenyl)salicylanilide of the formula

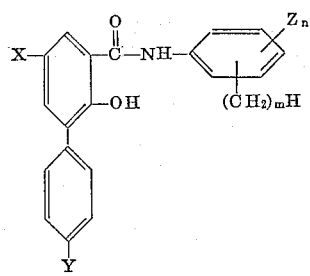

wherein X is selected from the group consisting of hydrogen and halogens of atomic weight in the range of 35 to 80, wherein Y is halogen of atomic weight in the range of 35 to 80, wherein $m$ is an integer from 0 to 1, wherein Z is halogen of atomic weight in the range of 18 to 80, and wherein $n$ is a whole number from 1 to 3.

2. A 5-chloro-3-(4-chlorophenyl) salicylanilide of the formula

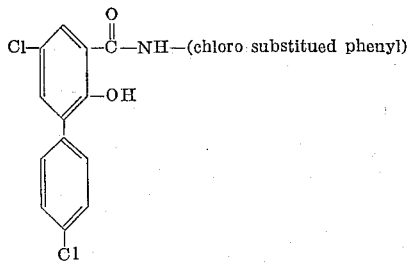

wherein the chloro substituted phenyl has from 1 to 3 chlorine substituents and wherein the phenyl nucleus of the said chloro substituted phenyl is free of a chloro substituent on a carbon atom ortho to the —NH— group.

3. 4′,5-dichloro-3-(4-chlorophenyl)salicylanilide.
4. 3′,4′,5-trichloro-3-(4-chlorophenyl)salicylanilide.
5. 2′,5,5′-trichloro-3-(4-chlorophenyl)salicylanilide.
6. 2′,4′,5,5′-tetrachloro-3-(4-chlorophenyl)salicylanilide.
7. 4′,5-dichloro-3-(4-bromophenyl)salicylanilide.

References Cited by the Examiner

UNITED STATES PATENTS

| | | | |
|---|---|---|---|
| 2,703,332 | 3/1955 | Bindler et al. | 260—559 |
| 2,745,781 | 5/1956 | Stewart | 167—31 |
| 2,773,096 | 12/1956 | Sahyun et al. | 260—559 |
| 2,802,029 | 8/1957 | Schuler | 260—559 |
| 2,865,861 | 12/1958 | Stephens | 260—559 XR |
| 3,012,934 | 12/1961 | Cantrel et al. | 167—31 |
| 3,079,297 | 2/1963 | Schraufstatter et al. | 260—559 XR |

OTHER REFERENCES

Frear et al., "Jour. Economic Entomology," vol. 40, pp. 736–41 (1947).

Horsfall, "Fungicides and Their Action," p. 151, Waltham, Mass., Chronica Botanica, 1945.

WALTER A. MODANCE, *Primary Examiner.*

R. L. PRICE, N. TROUSOF, *Assistant Examiners.*